United States Patent [19]
Pink et al.

[11] Patent Number: 5,618,335
[45] Date of Patent: Apr. 8, 1997

[54] AIR OIL SEPARATOR

[75] Inventors: Edward N. Pink; Michael F. Johnson, both of Los Angeles County, Calif.

[73] Assignee: Edelbrock Corporation, Torrance, Calif.

[21] Appl. No.: 274,901

[22] Filed: Jul. 13, 1994

[51] Int. Cl.$^6$ ................................................ B04B 11/06
[52] U.S. Cl. ............................ 96/208; 96/214; 96/216
[58] Field of Search ........................... 96/195, 208, 214, 96/216, 217

[56] References Cited

U.S. PATENT DOCUMENTS

| | | | |
|---|---|---|---|
| 1,863,111 | 6/1932 | Greve | 96/216 |
| 2,538,983 | 1/1951 | Sharples | 184/6.13 |
| 4,220,121 | 9/1980 | Maggiorana | 96/216 |
| 4,681,189 | 7/1987 | Krisiloff | 184/6.13 |
| 4,976,854 | 12/1990 | Yano et al. | 96/208 |
| 4,997,556 | 3/1991 | Yano et al. | 96/216 |
| 5,182,031 | 1/1993 | Lamort | 96/214 |

FOREIGN PATENT DOCUMENTS

| | | | |
|---|---|---|---|
| 687343 | 5/1964 | Canada | 96/208 |
| 1049363 | 1/1959 | Germany | 96/214 |

*Primary Examiner*—Thomas R. Weber
*Attorney, Agent, or Firm*—Ronald M. Goldman

[57] ABSTRACT

An air oil separator adapted for attachment to a dry sump type oil pump incorporates a novel centrifuge and air ducting system. The centrifuge is formed of two disks axially spaced on a hollow rotatable shaft with the shaft having small air passages located between the disks that extend radially through to a hollow interior of the shaft. An air duct couples an open end of the centrifuge shaft to an air outlet for exhausting air from the shaft interior to the upper air side of the oil sump. Axially rotating at high speed the centrifuge separates air from inputted oil by throwing the oil to the outer reaches of the housing where the oil exits through an outlet and the separated air is exhausted through the shaft and duct.

22 Claims, 4 Drawing Sheets

Fig_1

Fig_2

Fig_3

Fig_4

Fig_5

Fig_7  Fig_6

Fig_8    Fig_9

Fig_10    Fig_11

Fig_12 even

AIR OIL SEPARATOR

FIELD OF THE INVENTION

This invention relates to air oil separators and, more particularly, to an improved air oil separator for integration within a dry sump type high performance automobile oil pump system.

BACKGROUND

Modern high performance automobiles, such as those used in automobile racing, incorporate dry sump oil pump systems to provide engine lubrication under the extreme operating conditions encountered in automobile racing. In dry sump systems, oil is stored in a separate oil tank or sump that, unlike the wet sump system of conventional passenger automobiles, is separate from the engine. The oil pump and associated oil lines circulates oil from that sump to the engine. After use in the engine, the oil is pumped out of the engine by scavenger pumps acting through oil pick-ups appropriately placed on the engine's underside, the engine oil pan, and is returned to the sump for recirculation. The oil is recirculated in that way through the engine in a continuous process. In practice the scavenger pumps are integrally packaged with the principal oil pump and are driven by the same pulley and shaft system that drives the principal oil pump.

A typical scavenger pump system may contain one, two, three or more scavenger pumps, depending upon one's performance needs, whose outputs are placed in common in the pump unit so that the oil may be returned to the sump by a single return oil line. Each scavenger pump employs a pair of rotors on separate shafts arranged for counter rotational movement within a compartment with the compartment open to the salvage oil line. Rapid intermeshing rotation of the engaged rotors creates a low pressure or suction that sucks the salvageable oil through the intake and then forces that oil out the drain end to the sump's oil return lines. Hence, the greater the number of salvage pumps employed, the greater vacuum or sucking is achieved. A particular form of rotor, referred to as the Roots rotor, long ago found wide acceptance in scavenger pumps for such application.

The oil pump system is not sealed to the environment and, consequently, air enters the automobile's oil system. In addition to oil, thus, the oil sump also contains air. Air is also mixed within the oil. Indeed the more effective the scavenger pumps and oil pumps, it is found, the greater percentage of air is found mixed in the oil. Since air does not lubricate engine parts nor provide cooling of those parts as effectively as oil, unless the air is removed, one finds that, although the requisite volume of oil is seemingly being pumped to provide sufficient cooling and lubrication to the engine, in fact, the lubrication and cooling is insufficient. As a consequence the engine may overheat and bearings and other parts may prematurely fail.

The foregoing difficulty was earlier recognized by the Cosworth company of the United Kingdom. That company introduced an air-oil separator for attachment onto an oil pump assembly. The Cosworth separator separated the oil from the air and separately returned those ingredients to the oil sump, the air to the top side of the pump and the oil to the lower portion containing the oil.

Briefly, the Cosworth air oil separator incorporates a rotating drum and an impeller, containing outwardly extending vanes, positioned within the drum and means to rotate the drum and impeller in opposite rotational direction. Through centrifugal force scavenged oil introduced into the separator is thrown outwardly to the drum. In turn, holes through the drum allows the oil to exit an area on the outside the drum. Air, which becomes concentrated in the central region by the impeller, exits through passages formed in the impeller. The unit also incorporated a shuttle valve that blocked the oil outlet, when no oil was present in the separator, so that air is not forced into the return oil line. Although successful in result, the complexity of the drum impeller arrangement only briefly discussed, translates to a very high cost for the unit in practice, and, hence, as a practical matter, limited availability of that separator to the large number of automobile hobbyists and professionals involved in automobile racing.

An object of the present invention, thus, is to provide an improved oil pump system and, particularly, an air-oil separator of simpler construction than heretofore and consequent reduced manufacturing costs.

A further object of the invention is to provide an air oil separator that easily integrates within a dry sump type oil pump assembly to form overall a compact physical assembly that is easily handled and installed within an automobile.

And an additional object of the invention is to provide an air oil separator that avoids use of the complex counter rotating drum and impeller system for air oil separation.

SUMMARY

In accordance with the foregoing objects, the air oil separator of the invention applies the oil to a novel centrifuge to separate the oil from the air and pump out such oil and air through separate outlets. The centrifuge incorporates two disks axially spaced on a hollow shaft. The shaft contains small air passages, located between the disks, that extend radially through to the interior of the shaft. The spinning centrifuge separates the air from the oil introduced into the separator, throwing the oil outwardly, where it is intercepted and pumped through an outlet for return to the oil sump essentially free of suspended air. Less dense air, however, remains in the vicinity of the centrifuge and under pressure enters the hollow shaft interior from which the air is expelled. An air transfer means is included to pass air from the shaft interior external of the separator. Suitably, such air transfer means comprises an air duct coupled between an open end of the centrifuge shaft and an air outlet.

In accordance with a specific aspect to the invention, the air duct is generally cylindrical in shape and contains one end that is fitted within the open end of the centrifuge shaft and an opposed end seated to the housing at or in the air outlet. O-ring seals seated, respectively, within the centrifuge and in the air outlet engage the outer surface of the air duct to provide an essentially leak free rotary or bearing connection, supporting the duct therebetween and allowing the centrifuge to spin without necessarily turning the duct and/or allowing some rotation of the duct relative to the stationary separator housing.

As an additional advantage, the separator of the invention contains fewer component parts and therefor is expected to prove more reliable in operation and have extended life as compared to earlier designs.

In accordance with an additional aspect to the invention, a cut off valve maintains the air outlet closed until the oil pressure within the separator reduces in level to one indicative of steady state oil flow therethrough.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

DESCRIPTION OF THE PREFERRED EMBODIMENTS

Figure 1:
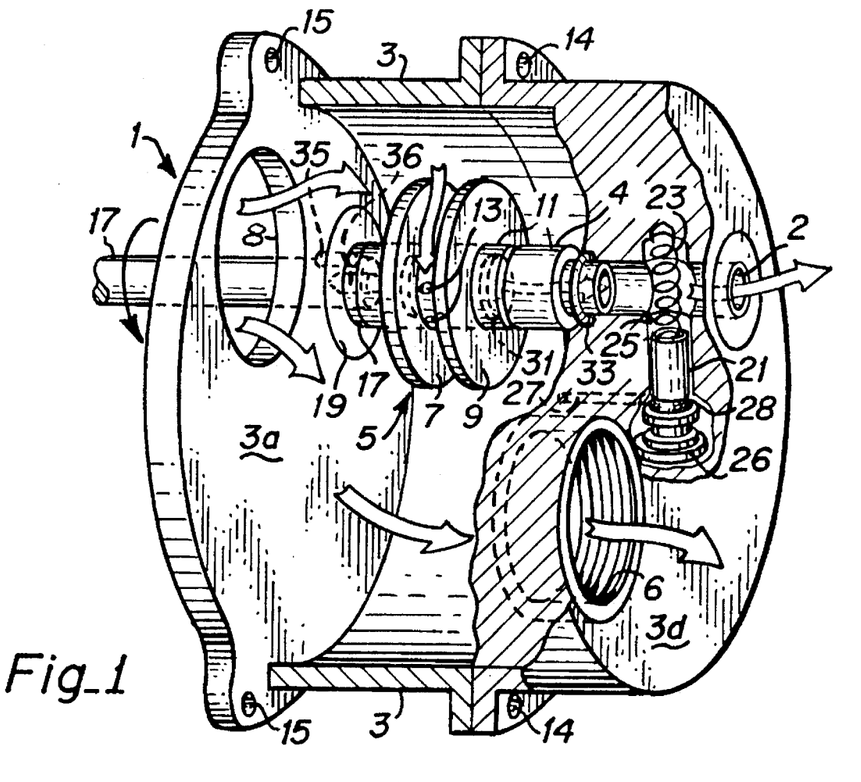
FIG. 1 pictorially illustrates an embodiment of the novel air oil separator with a portion of the housing walls omitted.

Reference is made to FIG. 1, which pictorially illustrates an embodiment of the novel air oil separator 1, as viewed from the rear, in simplified and exaggerated form as better illustrates the elements and the principals of operation for ease of understanding. It should be understood that the convention of reference herein used is that the left end of the figure, which is intended to be directly connected to an oil pump, is regarded as the front end of the separator, and that the end to the right, is the separator's back or rear end. Separator 1 includes a housing 3, illustrated partially cut away to permit view of the confined elements, including a generally cylindrical inner wall and, within a cavity formed in the housing, a centrifuge 5, mounted for rotation about its axis as indicated by the arrow, is positioned asymmetrically, off center and to one side of the housing. To the right in the figure, an air outlet 2, is accessible to the housing cavity with the inlet end being essentially aligned with centrifuge 5 so as to also be off center of the housing axis. The air outlet extends through the thick wall 3d of the housing, located at the right in the figure. An oil outlet 6, is located off center and to the opposite side of the housing than air outlet 2. An oil inlet 8 is provided in the opposite housing wall 3a. In operation oil inlet 8 is coupled to the scavenge oil outlet of an associated oil pump, as later herein discussed in connection with FIG. 2. An air duct tube 4, suitably a hollow aluminum cylinder, is connected between an open end of centrifuge 5, essentially coaxial therewith, and air outlet 2, suitably by couplings generally represented as 31 and 33 in the figure.

The housing may be formed in two mating parts, suitably from billet aluminum plate or die cast aluminum that is machined to shape and anodized, and the parts are appropriately keyed and/or are otherwise aligned and joined together. The housing parts includes appropriate means, such as bolt holes 15, for mounting the separator to other apparatus, such as to an oil pump later hereinafter described.

The centrifuge, suitably aluminum, is formed of a pair of disks, 7 and 9, coaxially mounted and spaced apart on a shaft 11. The shaft contains a hollow interior open at one end facing the reader, indicated in dash lines, and contains a plurality of small air passages 13, only two of which is visible in the figure, extending radially through the shaft to the shaft interior. Air passages 13 are located on the shaft portion between disks 7 and 9 and are evenly positioned about the shaft's circumference at that axial position, and spaced also from the ends of the shaft.

The distant end of shaft 11, to the left is connected to and supported for rotation by a driving shaft 17, suitably the oil pump shaft, represented in dash lines to the upper left, being preferred as later discussed. The driving shaft is suitably supported by a bearing 19, such as a ball bearing, located in housing wall 3c, at the left in the figure. Centrifuge 5 and air duct 4 are thus supported mechanically in series between the driving shaft to the left and a housing wall, 3d, to the right.

Depending upon the form of coupling 31 that is chosen, duct 4 may rotate relative to shaft 11, as example, where the coupling is an O-ring seal, a form of rotary joint, or, in other embodiments, the duct may be fixed to the shaft 11, as example, where the coupling is a weld, so as to rotate therewith. In either embodiment, duct 4 is permitted to rotate relative to housing wall 3d, which is stationary. In its simplest form, coupling 33 comprises a groove or seat in wall 3d in which the end of the duct is received, as forms a rotary joint. In the preferred form coupling 33 is an O-ring seal, which produces less friction to rotation than metal to metal contact and provides a more reliable protection against air leakage.

As becomes apparent from the description of operation hereafter, duct 4, in alternative embodiments, may be integrally formed as part of shaft 11, by extending the length of shaft 11 to define a one piece assembly. Such a structure eliminates coupling 31. However, the duct and centrifuge are preferably formed in two separate pieces as illustrated, since it is less complicated to produce the parts and, being formed in separate pieces in practice, the duct compensates for slight axial misalignment between the inlet end to air outlet 2 and the axis of shaft 11.

The description of piston 21, spring 23, which are located in cylindrical chamber 25, and passage 27, which together form the pressure cut off valve is temporarily deferred to a later point in this description. Other less important elements labeled in the figure are later described in connection with the practical embodiment of FIGS. 3 through 12.

Figure 2:
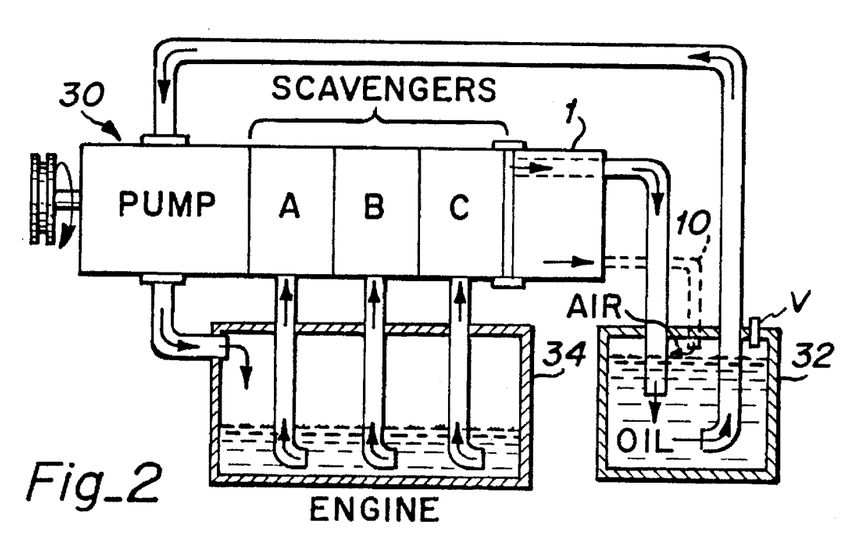
FIG. 2 is a diagram of an engine oil pumping system that includes the air oil separator of FIG. 1.

Reference is made to the symbolic diagram of FIG. 2, illustrating the preferred mounting and positioning of the air oil separator of FIG. 1 in connection with and as an integral part of an automotive oil pump system. As shown an oil pump 30 contains several pump sections formed in a single unitary assembly, typically including a principal pump section, labeled Pump, that sucks oil from oil sump 32 and pumps it into engine block 34, and a number of scavenger pump sections, designated A, B and C, that sucks the oil, including emulsified aerated oil, from the engine block via separate sensors or oil pick-ups, as variously termed, and oil conduits or lines and then pumps the scavenged oil, together with the air that the sucking action of the scavenge pumps introduces, in common from the pump's outlet, not illustrated, located at the right hand side in the figure. Without the air oil separator, the scavenged oil is pumped directly back to the oil sump 32. With the accessory air oil separator 1 attached to the end of the oil pump as shown, oil pump 30 instead pumps the scavenged oil into the separator 1 via its oil inlet, 8 in FIG. 1, and the separator returns the scavenged oil to the oil sump via the illustrated conduit air return line 10, indicated in dash lines, extends from separator 1 to the top side of the oil sump. Typically in practice an end of the oil pump shaft is used to drive the air oil separator. The pump's shaft directly spins centrifuge 5 of FIG. 1. Should the oil pump contain multiple shafts, only one of those shafts is used for that purpose.

When the automobile engine stands unoperated, over time the oil drains down into the oil pan, whereby the oil in the engine pan is at a maximum level and that in the engine is at a minimum. The oil found in the air oil separator at the time the engine was shut off remains in the separator. When the engine is started and running, the oil pump pumps oil from sump 32 into the engine block, restoring to the engine the oil previously drained, while the companion salvage pumps remove oil from the engine's oil pan, then at a maximum oil level, pumping that salvaged oil into the air oil separator and onto the centrifuge. That initial action essentially fills air oil separator 1 with oil, a factor that is relevant to the operation of the cut off valve, later herein described.

The salvage pumps, A, B, and C, quickly drain the oil from the pan at a faster rate than the principal pump delivers oil to the engine block and, hence, to the pan. Consequently, the oil level in the pan quickly falls, typically taking about ten to fifteen minutes of engine operation to reach that stage, as the engine heats up. Because of the reduced oil level in the pan at this stage, some portion of the salvage pumps oil pick-up's entrance, located at the bottom of the engine oil pan, becomes uncovered and is exposed to air in the pan. As example, assuming a one inch diameter oil pick up, inlet as much as three quarters of an inch becomes uncovered and only about a quarter inch remains immersed in the pan's oil. Because of the efficiency of the salvage pumps, those oil pick ups consequently suck up not only a reduced volume of oil, but also air. In turn, the volume of oil introduced by the salvage pumps into the air oil separator drops, and the salvage pumps introduce both air and oil into the air oil separator, the steady state condition, giving reason for the air oil separator' desirability in this application.

Reference is again made FIG. 1. Assuming that cut off valve piston 21 is in the position illustrated, and that the engine, oil pump and air oil separator have been in operation for at least some fifteen minutes so that the oil system is in a steady state condition, centrifuge 5, including shaft 11 and the attached disks 7 and 9, is rotating at high speed, driven by oil pump shaft 17. That is, shaft 11 turns around and round, each time over a 360 degree arc, cyclically rotating.

The oil pump scavange stages pump oil through oil inlet 8 into the separator housing, as shown by the arrow, and centrifuge 5, rotating at high speeds, disperses the oil and effectively throws the heavier than air oil to the opposite side of the housing, pooling the oil against the opposite side portion, thereby releasing any air that is emulsified in the oil. This is analogous to that which occurs in beating eggs in an electric mixer. Air duct 4 may also turn, either dragged at a lower rotational speed by shaft 11 or turning with the same rate as the shaft, depending on the strength of coupling 31. That duct also axially rotates relative to stationary housing wall 3d, which o-ring coupling 33 permits.

Oil outlet 6 is positioned to receive the oil thrown by the centrifuge, and oil then exudes from that outlet. The air, being less dense than oil, remains in the vicinity of the spinning centrifuge. As the air pressure builds, that air, and necessarily some oily mist, is forced through air passages 13 in centrifuge shaft 11 to the shaft's interior passage. The air and oily vapors exit the separator through air outlet 2, via the shaft interior passage and duct 4. Suitable conduits or lines, illustrated in FIG. 2 earlier described, connect air outlet 2 to the top side of the oil sump so the outlet end is located above the oil in that sump, and connects the oil outlet 6 to the lower portion of the oil sump, where the essentially air free oil is deposited for use by the oil pump system.

The preferred form of the air oil separator also includes a pressure operated cut off valve, shown in the open position in FIG. 1 and represented in the figure by piston 21, calibrated spring 23 with which to bias the piston, both of which are positioned in an internal cylindrical chamber 25, that intersects the air outlet in the air passage way between the inlet and outlet ends of air outlet 2. An oil sensor 27 is operatively connected to the pressure valve. That sensor is a small passage formed in housing wall 3d, extending from the cavity side of the wall to the underside of chamber 25. The sensor passage admits oil from the cavity, transmitting the pressure of the oil to a location on one side of piston 21. It is seen that the cut off valve is simply a conventional pressure operated piston, biased by a pressure calibrated biasing spring.

The cut off valve normally maintains the air outlet closed during the initial period earlier described when the engine is warming up and opens when the oil pressure in the cavity drops as the oil pumping attains the steady state operating condition. Normally, before engine operation and in the initial operation of the oil pump, the cavity within the separator is essentially filled with oil; that oil produces essentially a relatively high pressure. With such high oil pressure present on the underside of plunger 21, the plunger is raised in cylindrical passage 25, compressing spring 23, moving into a position that blocks air outlet 2, which is regarded as the normal position. After some minutes of operation, however, the volume of oil in the separator cavity drops, reaching the steady state condition of the oil system, and the oil pressure is then lowered, as was earlier described in greater detail hereinafter. Spring 23 then moves the piston down past the air passageway to the position illustrated in FIG. 1, thereby unblocking the air outlet passage and permitting air to exit outlet 2.

Once the salvage pumps deliver a larger volume of air in the oil, the oil pressure in the separator drops and the air pressure increases. At this point the oil pressure metered at sensor inlet 27 of the pressure valve reduces, lessening the upward force exerted on the bottom of the valve piston 21. The piston moves downward in chamber 25, assisted by compression spring 23, and opens the air passage through air outlet 2. Air thereby is expelled from the separator.

Although not critical to air oil separation, the cut off valve serves a useful function in practice. The air line must be returned to the oil sump, and cannot be left exposed to the outside environment. It's not just air but an oily mist that contains oil vapors as could pose problem to the environment. The oil sump typically contains an air vent, represented as V in FIG. 2. In practice, should the vehicle owner incorrectly install the separator's air return line outlet too close to the air vent, in the event of a malfunction in which oil is inadvertently pumped through the air line instead of dropping into the tank, the returned oil could possibly be sucked out the air vent, effectively, being siphoned from the oil sump. In that circumstance one soon finds that the engine is without oil and engine damage occurs. The air cut off valve precludes that undesirable effect, permitting only air to be expelled through the air line, and not a significant volume of oil.

It is recognized that when the air oil separator is newly installed in the engines oil pump, no oil is present in the separator and, hence, the cut off valve on that occasion is also open. Installation, however, is a one-time event, and that circumstance is not regarded as the normal condition in this description of operation. The cut-off valve is open at each engine restart.

With the simple centrifuge and air ducting system described, an air oil separator is achieved that is more easy to construct and maintain than prior such separators. It is possible of manufacture at lesser cost, which, when reflected in lower selling prices, permits the dissemination of air oil separators and its benefit to greater numbers of automobile drivers.

Although the simplified diagrams of FIGS. 1 and 2 adequately illustrated the principles of the invention, additional improvements are presented in a practical embodiment of the invention that is illustrated and discussed in connection with the succeeding drawing FIGS. 3 through 11. For convenience and ease of understanding those elements in the succeeding figures that correspond to elements previously identified in the preceding figures are hereafter identified with the same numerical designation primed.

Figure 3:
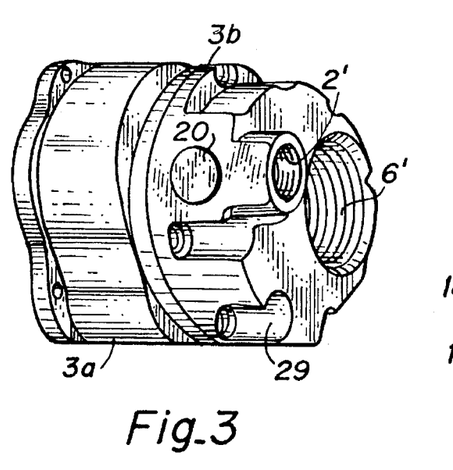
FIG. 3 is a rear perspective view of a practical embodiment of the invention.
Figure 4:
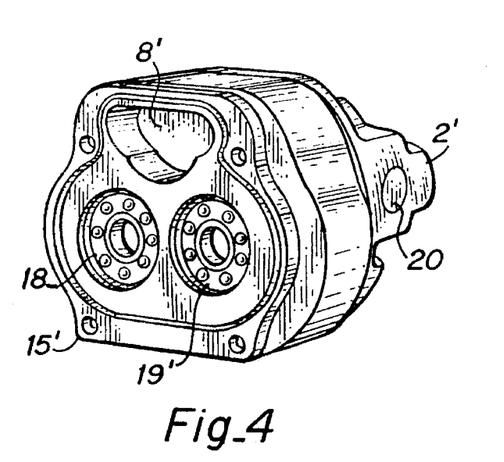
FIG. 4 is the embodiment of FIG. 3 viewed in perspective from the front.

A rear perspective view of a more practical embodiment of the air oil separator 1' is illustrated in FIG. 3, and a front perspective view, the end connected to the oil pump assembly, in FIG. 4, considered together. The embodiment is distinguished by a compact metal housing formed in two parts, including housing portion 3a, to the left, and housing portion 3b with threaded openings in air passage 2' and oil passage 6' for permitting easy installation of conventional air and oil line connectors, not illustrated in this figure. The separator is adapted for assembly to a dual shaft oil pump, which is accomplished with bolts, not illustrated, placed through bolt openings 15'. The ends of the driving shafts for the oil pump are positioned to extend into housing 3a, as later described in greater detail and are supported by bearings 18 and 19', which, preferably, for reduced friction, are ball bearings.

Figure 5:
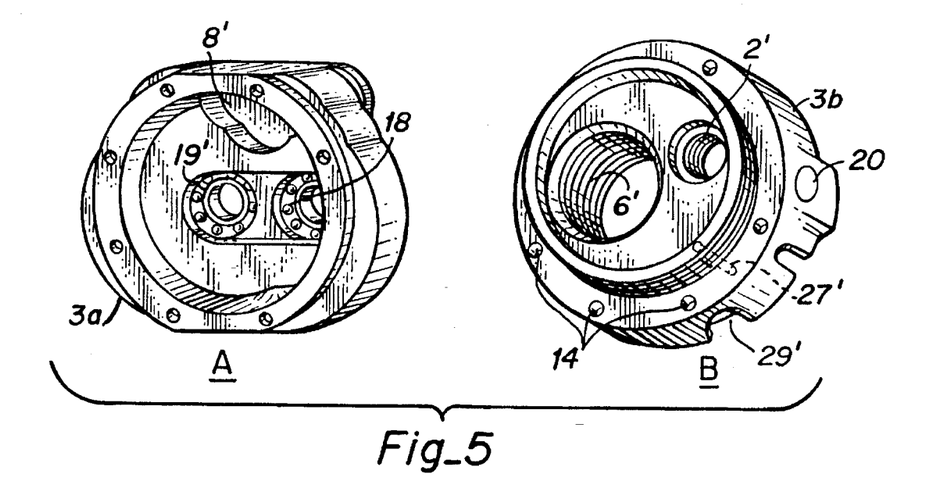
FIGS. 5A and 5B show the embodiment of FIG. 3 with mating housing portions, with each portion turned about to reveal the respective interior, but with the internal components removed, the front housing portion as viewed from the rear, shown in FIG. 5A, and the interior of the rear housing portion as viewed from the front side shown in FIG. 5B.

The two housing portions of the air oil separator are separated and turned to show the insides, with the internal components omitted for clarity, in FIG. 5A, which shows the inside of front housing portion 3a and FIG. 5B, which shows the inside of rear housing portion 3b. The two portions are joined together by bolts, not illustrated, and bolt holes 14 are provided for that purpose, suitably asymmetrically arranged to ensure that the housing portions are correctly aligned relative to one another on assembly of the unit.

If desired for directional oil flow control, an arcuate flange or deflector, as variously termed, may be included on the protruding cylindrical rim in rear housing portion 3b, extending over a quarter or so of the circular periphery. The length of such a flange is such that when the rear housing portion is assembled to the front housing portion the flange extends into the front housing portion and, within the formed cavity defines an arcuate space with the housing's interior wall. Such flange would be located in the cavity diametrically across from the centrifuge. Such a flange is not included in the preferred embodiment.

Figures 6, 7:
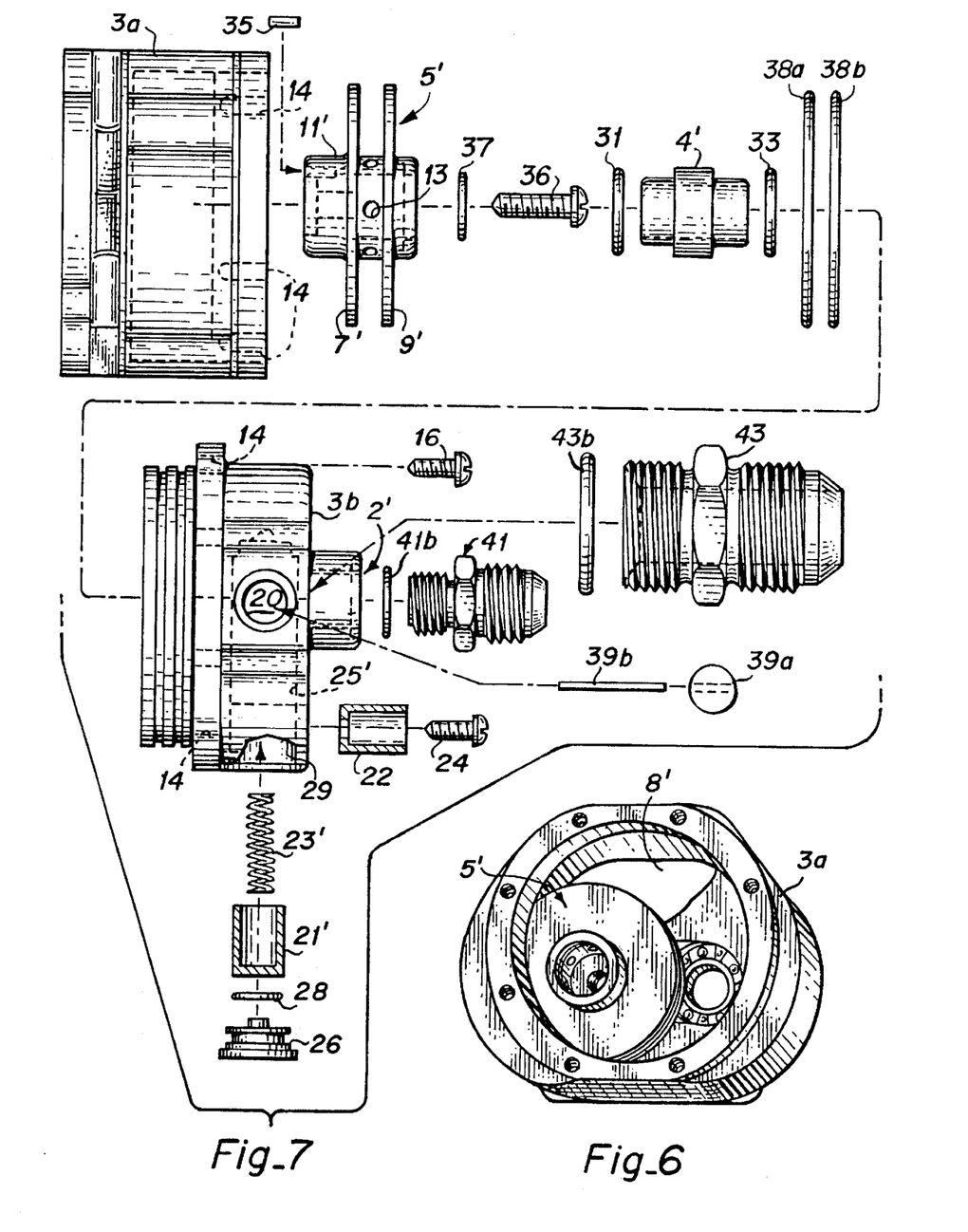
FIG. 6 is a perspective of the front housing portion of FIG. 5A as viewed from a slightly different angle and drawn to a slightly larger scale, illustrating the position of a centrifuge element in the housing.
FIG. 7 illustrates the embodiment of FIG. 3 in a partially exploded view, drawn to the same scale as FIG. 6.

The perspective view of FIG. 6, shows the centrifuge 5' positioned within the internal cavity formed within housing portion 3a. Such internal cavity underlies a front peripheral bracket area, containing threaded bolt holes 14". As shown the centrifuge is asymmetrically positioned in the housing and occupies a substantial portion of the cavity.

Reference is now made to FIG. 7 which presents an exploded view of the separator and its principal elements, including housing portions 3a and 3bcentrifuge 5', air transfer tube or duct 4', the pressure cut off valve spring 23' and piston 21', which correspond to the like numbered elements earlier described in connection with FIG. 1. Housing portion 3b contains a depending cylindrical portion, shown to the left on the element, that fits inside the complementary housing portion 3a. That cylindrical portion includes two seal seats circumscribing the cylindrical housing portion that seats o-ring seals 38a and 38b. The o-ring seals seal to housing portion 3a and preclude air or oil leakage from the juncture between the two housing portions.

An adapter fitting or connector 41 for insertion into air outlet 2' and an associated o-ring seal 41b are included in this view. A larger connector of the same type 43 is screwed into oil outlet 6', and sealed with o-ring 43b. The foregoing line connectors permit easy connection of the outlets to corresponding lines of the oil pumping system, such as the air and oil output lines illustrated in FIG. 2, are of conventional structure and are commercially available. The additional elements will be described in connection with the additional figures.

Centrifuge 5' contains the pair of spaced washer shaped disks 7' and 9' coaxially positioned on and extending radially outward from the stubby generally cylindrical shaft 11', preferably formed in a one piece unitary assembly with the fins or disks located a short distance away from the top and bottom ends of the shaft. Small holes or passages 13, six in number, as example, only one of which is numbered, are located in the shaft portion located between disks 7' and 9'. Those passages extend from the outer shaft surface to the interior, providing an air communication path to the shaft's hollow interior.

Figures 8, 9, 10, 11:
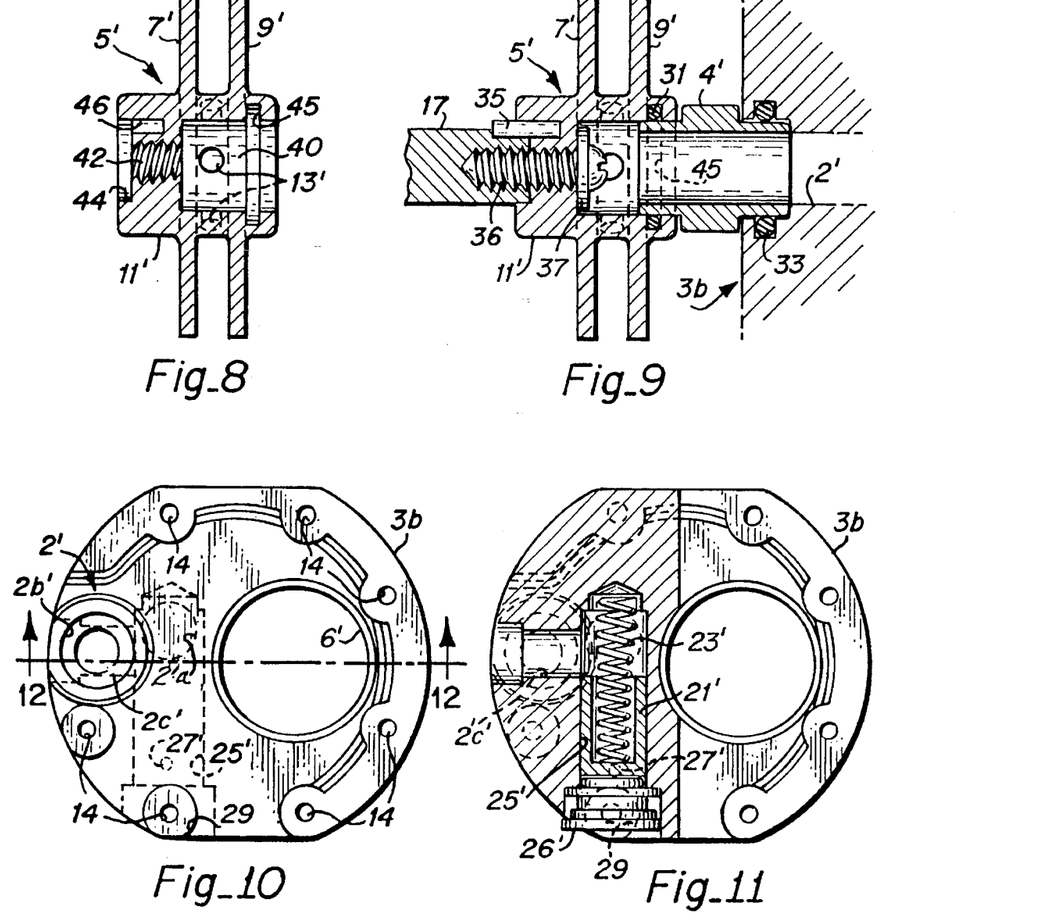
FIG. 8 is a section view of a centrifuge element that appears in FIG. 7, drawn to a slightly larger scale.
FIG. 9 is a side section view of the centrifuge of FIG. 8 shown assembled with an air duct element between a driving shaft and the air outlet, partially illustrated, found in the embodiment.
FIG. 10 is a front elevation view of the rear housing portion, drawn to the same scale as FIG. 7.
FIG. 11 is a partial section of the view of FIG. 10 to better illustrate a pressure cut off valve piston channel and part of the air passage elements formed within the housing portion.

Considering centrifuge 5' and duct 4 in greater detail, reference is made to FIGS. 8 and 9, which respectively illustrate centrifuge 5' in section and the assembly of the centrifuge and the associated air duct 4 in the assembled form as resident in the separator of FIG. 3. It is appreciated that the centrifuge is relatively small in size. In one practical embodiment the spacing between disks 7' and 9' is about 0,250 inches and the disks are about two inches in diameter and 0,125 inches in thickness and are integrally formed on a shaft 11' of one inch outer diameter and 1.10 inch in height. As shown in the section view of FIG. 8, the centrifuge shaft 11' includes a hollow interior cavity 40 that communicates with air passages 13' and an open end on the right side in the figure. Axially extending passage 42 serves as a bolt stem receiving passage and the enlarged region 44 at the left end of the shaft is sized to receive the end of the oil pump shaft, as better illustrated in the companion section view of FIG.

9, and short passage 46 serves as a key hole for the pin, 35, that locks the oil pump shaft to the centrifuge's shaft 11 as later herein described in greater detail. A seal seat 45 is provided for an oil ring seal when the duct is assembled to the shaft end, such as seal 31 in FIG. 9 to which reference is made.

A bolt 36 and washer 37 fit within the hollow interior of the centrifuge shaft. The bolt fits through the bolt opening in the bottom of shaft 11' and fastens to the oil pump shaft 17', partially illustrated, by means of a threaded opening in the oil pump shaft, thereby allowing the pump shaft to rotate the centrifuge. The bolt and washer also ensure that the left end of the shaft's interior is closed, permitting air to exit the shaft interior during operation only by flowing to the right.

Bolt 36 is ordinarily sufficient to hold the shafts together for joint rotation. As an enhancement, the coupling is made more secure by locking the two shafts together with the addition of a simple key and slot coupling. Thus as shown in FIG. 9, the end of shaft 17' is fitted with a pin key 35, while the end of the centrifuge shaft 11' contains groove or key slot 46, earlier identified in FIG. 8, to receive that key. With the two shafts angularly oriented so that the key mates with, that is enters, key slot 46, the shafts are locked together rotationally. Bolt 36 is then inserted on washer 37 and inserted through the hollow in shaft 11' to the threaded hole in the oil pump shaft, is tightened down and properly torqued. Thus even though bolt 36 might eventually loosen slightly in use, the key slot locking arrangement ensures that the oil pump shaft continues to drive shaft 11'.

Continuing with the section view of FIG. 9, O-ring seal 31 is seated within seal seat 45 formed within the interior of the centrifuge shaft and an end of duct 4' nests within the interior of shaft 11', with the outside surfaces of the duct engaged by the o-ring seal. The banded portion of the duct is larger in diameter than the nested portion and serves as a stop that prevents over insertion within the shaft's interior. With o-ring seal 33 seated in the housing portion 3b partially illustrated in section, and surrounding the air outlet 2', the right end of the duct is pressed a short distance within the air inlet with the outer surface of the duct engaging seal 33. Thus in this embodiment, one end of the centrifuge and duct subassembly is supported by the oil pump shaft and the opposite end of that subassembly is supported by the housing portion 3b.

To function as a centrifuge, one necessarily observes that during operation shaft 11' rotates at high speeds, while housing 3b remains stationery, much like the operation described earlier for the simplified version of FIG. 1. Hence the subassembly also includes a form of rotary joint or bearing that permits decoupling of rotary motion between shaft 11' and duct 4' and/or between the end of the duct and housing 3b or adequate slip between those elements. In this embodiment, o-ring seals 31 and 33 also serve that function.

Thus in operation O-ring seal 31 may have a light enough frictional engagement with the outer surface of the duct to allow the shaft to turn without also turning duct 4'. If, however, due to greater frictional coupling, duct 4' is dragged along by the shaft, with some slippage, and thus at a lower rotational speed, O-ring seal 33 provides an adequate bearing surface, permitting the duct to rotate relative to stationary housing 3b. Although other forms of bearings and rotary joints may be substituted, they appear more expensive and/or complicated in structure. The o-ring seal serves the function economically and effectively and seals the air passage to undesired entry of oil as well. Since oil is present in the housing and since even the air contains an oil mist, the O-ring seals will normally receive adequate lubrication for extended life.

The cut off valve is next considered in greater detail. As earlier illustrated in FIG. 7, to which reference is again made, the valve chamber is formed by a cylindrical passage 25' in housing portion 3b suitably by drilling, into which spring 23' and piston 21', a flat bottomed cylindrical member open on one side that receives spring 23', are inserted. The end plug 26 covers the end of the cylindrical passage and sealed by o-ring seal 28 to prevent leakage. An axially extending semicylindrical groove 29 in the housing, better illustrated in FIGS. 3 and 5, underlies chamber 25 and end plug 26. A hollow cylindrical plug 22 fits in that groove and is fastened in place by bolt 24, which extends through the hole in the bottom of plug 22 and into a threaded hole in the housing. The cylindrical side wall of plug 22 abuts against end plug 26 to assist in securing plug 26 in place closing the end of chamber 25.

As illustrated in the rear view of rear housing portion 3b in FIG. 10 and the partial section view thereof in FIG. 11 to which reference is made, the inlet end of air outlet 2', which is inside the internal cavity is indicated by the circle 2' a is displaced vertically and horizontally from the outlet end 2'b of that same passage shown to the right side in FIG. 10. Cylinder 25', intersects the inlet end of air outlet 2' and a sideways passage 2'c, that extends horizontally within the housing wall, the latter of which is formed by drilling into the housing from the left side. The sideways passage in turn intersects air passage outlet end 2'b.

Figure 12:
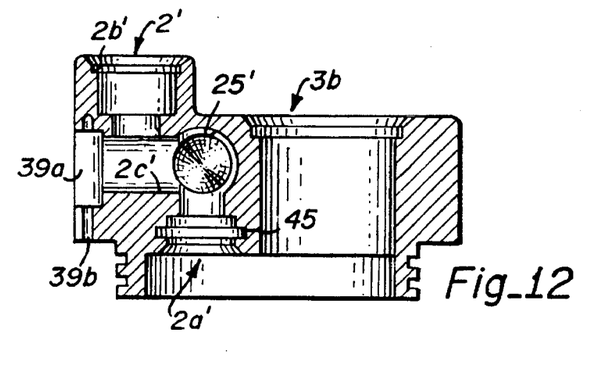
FIG. 12 is a section view taken along 12—12 in FIG. 10 to illustrate the routing for the air outlet within the rear housing portion.

Turning to the section view of FIG. 12, which shows a section from FIG. 10, taken along the line 12—12, the sideways air passage 2c is shown more clearly. Cap 39a seals the outer end of passage 2c to prevent leaks and that cap is locked against rotation by key 39b which passes through the cap and into a key slot in the housing, not illustrated. The inlet end 2'a is sized to receive an end of duct 4' and then reduces in diameter to form a ledge or stop that limits axial movement of the duct as well as providing a bearing surface to rotational movement of the duct. The seal seat 45, which seats O-ring seal 33, shown in FIG. 9, located in front of that ledge, circumscribes the inlet end 2'a of the air outlet passage and is recessed from the inside wall of housing portion 3b. As shown, the pressure valve chamber 25' and air passage ways are conveniently formed by drilling straight passages in the metal material which forms the housing portion with those passages intersecting at right angles and then plugging the ends of certain of those holes to create the labryinth passage. The operation of the cut off valve is the same as described in the preceding embodiment.

In this embodiment the preferential piston 21' also serves as a shuttle, balancing the scavenge pressure and air pressure in the scavenge side of the pump assembly. As the air pressure builds up, the air passage becomes unblocked, permitting greater amounts of air to pass. When the steady state is reached, the air passage is completely opened. This balancing function requires a more judicious selection of the spring's spring constant to provide appropriate spring force to function with the particular scavenge back pressure of the particular oil pump with which the separator is used.

In general and except where otherwise noted in the preceeding description with respect to duct 4', the elements of the foregoing embodiment operates in essentially the same manner as those in the first described embodiment. Hence reference should be made to that prior description of operation which is not repeated.

It is believed that the foregoing description of the preferred embodiments of the invention is sufficient in detail to enable one skilled in the art to make and use the invention. However, it is expressly understood that the detail of the elements presented for the foregoing purposes is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. Air oil separator apparatus, comprising in a housing defining a cavity:

oil inlet means for admitting aerated oil to said cavity;

centrifuge means for centrifugally separating air from oil in said cavity;

said centrifuge means comprising:

a rotatable shaft having an axis of rotation for cyclical rotation about said axis, a hollow interior and an end that opens into said hollow interior; and a pair of disks, said disks being mounted to and coaxial with said rotatable shaft for cyclical rotation by said shaft about said shaft axis;

said rotatable shaft further including air passage means for communicating air external of said rotatable shaft to within said shaft interior;

air exit means for exhausting air from said shaft interior external of said housing; and oil outlet means, said oil outlet means being positioned within said cavity to receive oil separated by said centrifuge means.

2. The invention as defined in claim 1, wherein said air exit means comprises:

air outlet means for permitting air to exit said housing; and duct means defining an air passage from said open end of said rotatable shaft to said air outlet means for completing an air passage between said shaft interior to said air outlet means.

3. The invention as defined in claim 1, wherein said air passage means in said rotatable shaft comprises a plurality of air passages, said air passages being evenly distributed about the circumference of said rotatable shaft at a predetermined axial position therealong; and further comprising:

bearing means associated with said housing for permitting rotational movement of said duct means relative to said housing, said bearing means being positioned coaxial with said air outlet means; and bearing means associated with said rotatable shaft for permitting rotational movement of said rotatable shaft relative to said duct means.

4. The invention as defined in claim 3, wherein each of said bearing means comprises: an O-ring seal.

5. The invention as defined in claim 1, wherein said air passage means are positioned on said shaft at a location in between said disks.

6. The invention as defined in claim 1, wherein said pair of disks are spaced apart along the axis of and are spaced from the ends of said rotatable shaft; and wherein said air passage means in said rotatable shaft comprises a plurality of air passages, said air passages being evenly distributed about the circumference of said rotatable shaft at a predetermined axial position therealong.

7. The invention as defined in claim 1, wherein said centrifuge means is located at a position within said cavity asymmetric of the center of said cavity and wherein said oil outlet means is located at a position within said cavity asymmetric of the center of said cavity remote from said centrifuge means, whereby said oil outlet means receives oil dispersed by said centrifuge means and thrown to a remote side of said cavity.

8. The invention as defined in claim 2, wherein said rotatable shaft, air outlet means and said duct means are positioned in axial alignment; and wherein said rotatable shaft further includes means for coupling an end thereof to a rotating driving means, wherein said rotating driving means cyclically rotates said shaft.

9. The invention as defined in claim 8, wherein said duct means further comprises:

a generally hollow cylindrical body defining a hollow cylindrical interior and front and rear open ends with said body containing a raised band portion centrally positioned along the axis thereof and circumscribing the exterior surface.

10. The invention as defined in claim 2, further comprising:

first coupling means connecting one end of said duct means to said open end of said centrifuge shaft to support said end of said duct means;

second coupling means connecting the opposed end of said duct means to said air outlet means to support the other end of said duct means.

11. The invention as defined in claim 10, wherein said duct means fits within said open end of said shaft means and wherein said first coupling means comprises an o-ring seal, said o-ring seal being located on an interior surface of said rotatable shaft means and is in abutting relationship with an outer surface of said duct means.

12. The invention as defined in claim 11, wherein said duct means fits within said air outlet means and wherein said second coupling means comprises a second o-ring seal, said second o-ring seal being located on an interior surface of said air outlet means and is in abutting relationship with an outer surface of said duct means.

13. The invention as defined in claim 12, wherein said centrifuge means is located at a position within said cavity asymmetric of the center of said cavity and wherein said oil outlet means is located at a position within said cavity asymmetric of the center of said cavity remote from said centrifuge means, whereby said oil outlet means receives oil dispersed by said centrifuge means and thrown to a remote side of said cavity.

14. The invention as defined in claim 1, further comprising: pressure operated valve means, said valve means normally closing said air outlet means, and, responsive to the oil pressure of the oil within said cavity being below a predetermined level, for opening said air outlet means.

15. The invention as defined in claim 1, further comprising:

oil pump means;

said oil pump means, including:

oil outlet means coupled to said oil inlet means for supplying aerated oil to said oil inlet means, and shaft means for driving said rotatable shaft in cyclical rotationabout said axis; and shaft coupling means for coupling said shaft means to said rotatable shaft.

16. The invention as defined in claim 15, further comprising: means for supporting said housing to said oil pump means.

17. The invention as defined in claim 16, wherein said housing further includes: bearing means for supporting an end of said oil pump shaft means within said cavity.

18. The invention as defined in claim 16, wherein said rotatable shaft further includes axially extending bolt hole means extending through an end thereof opposed to said open end; and wherein said shaft coupling means, comprises:

bolt means for fastening said centrifuge to said oil pump shaft; said bolt means being received within said hollow interior of said rotatable shaft, said bolt means having a bolt head positioned in contact with a bottom end of said rotatable shaft that is in surrounding relationship with said bolt hole means; and wherein said oil pump shaft includes axially extending threaded bolt hole means in an end thereof for receiving said threaded portion of said bolt means, whereby said oil pump shaft supports said rotatable shaft for joint rotation.

19. The invention as defined in claim 18, wherein said shaft coupling means further comprises: key and slot coupling means, said oil pump shaft including one of said key and slot and said rotatable shaft containing the other of said key and slot to lock said respective shafts together for joint rotation.

20. In combination with a dry type sump automobile oil pump assembly, said oil pump assembly, including a plurality of oil scavenger pump sections arranged side by side in a row, and incorporating therewithin a pair of axially extending rotatable shafts common to each scavenger pump section with said shafts extending to and a predetermined distance through an end plate to expose an end of each shaft, at least one of said exposed shaft end including an axially extending threaded bolt hole; and a scavenged oil outlet in said end plate to permit exit of any aerated oil pumped by said oil scavenger pump sections, an air oil separator integrally mounted with and supported at an end of said oil pump, said air oil separator comprising:

a separator housing;

said separator housing, including an end wall mounted to said end plate, with said end wall including:

first and second bearings for rotationally supporting an end of each of said rotatable shafts of said oil pump assembly within the separator housing; and an oil inlet opening in said end wall positioned in communication with said scavenged oil outlet of said oil pump assembly for introducing aerated oil within said cavity;

centrifuge means for propelling oil outwardly toward the outer walls of said separator housing; said centrifuge means being located at a position within said cavity asymmetric of the center of said cavity and being exposed to said oil inlet;

said centrifuge means, including: a rotatable shaft having a hollow interior and at least one open end that opens to said interior, said rotatable shaft including a plurality of radially extending air passages therethrough to said shaft interior, said air passages being spaced about the circumference of said shaft at a predetermined axial position along said shaft; a pair of disks, said disks being coaxially mounted to said rotatable shaft for axial rotation by said shaft, with said disks being spaced apart along the axis of said rotatable shaft, with one said disk being located to one side of said air passages and the other said disk being located on the other side of said air passages in said rotatable shaft, and each said disk being spaced from the ends of said rotatable shaft;

said centrifuge shaft further including an axially extending bolt hole extending through an end thereof opposite said open end;

shaft coupling means for connecting an end of said shaft to one of said rotatable oil pump shafts for driving said centrifuge means, said shaft coupling means comprising:

bolt means for fastening said centrifuge shaft to said oil pump shaft; said bolt means being received within said hollow interior of said rotatable shaft and extending axially therefrom into threaded engagement in said bolt hole on said end of said oil pump shaft, with said bolt means having a bolt head positioned in contact with a bottom end surface containing said bolt hole in the interior of said rotatable shaft; and further comprises: key and slot coupling means to further lock said respective shafts together for joint rotation, said rotatable shaft containing one of said key and slot and said oil pump shaft including the other of said key and slot;

an air outlet in said housing, said air outlet having an inlet end located on a side wall of said cavity and aligned with said centrifuge shaft, an outlet end located on the opposite side of said side wall and displaced from the axis of said inlet end and passage way means within said side wall connecting said inlet and outlet ends of said air outlet;

duct means defining an air passage from said open end of said rotatable shaft to said air outlet means for completing an air passage between said shaft interior to said air outlet means, said duct means being axially aligned with said centrifuge shaft and said air outlet;

said duct means being generally cylindrical in shape and having an end fitted within said open end of said shaft and an oppose end fitted within said air outlet means to support said duct means therebetween;

first O-ring seal means connecting one end of said duct means to said open end of said centrifuge shaft to support said end of said duct means, said seal means being located on an interior surface of said rotatable shaft means and in abutting relationship with an outer surface of said duct means, whereby said duct means is permitted to rotate relative to said centrifuge;

second O-ring seal means connecting the opposed end of said duct means to said air outlet means, said seal means being seated within said air outlet means and being in abutting relationship with an outer surface of said duct means, whereby said duct means is permitted to rotate relative to said housing;

an oil outlet, said oil outlet being located at a position within said cavity asymmetric of the center of said cavity remote from said centrifuge means, whereby said oil outlet means receives oil dispersed by said centrifuge means and thrown to a remote side of said cavity; and valve means located in said housing, said valve means normally closing said air outlet means, and, responsive to the oil pressure of the oil within said cavity being below a predetermined level, for opening said air outlet means, said valve means including: a chamber within said side wall intersecting said air passage way in said air outlet; a piston located in said chamber for movement between a position blocking said air passage way and a position opening said air passage way; and spring means in said chamber for biasing said piston toward the position opening said air passage way and a sensor passage extending from said side wall containing said inlet end of said air outlet and within said wall to the underside of said chamber for introducing oil from said cavity to one side of said piston, whereby oil at high pressure in said cavity maintains said piston in the blocking position against the bias of said spring.

21. In combination with a dry type sump automobile oil pump assembly, said oil pump assembly, including a plurality of oil scavenger pump sections arranged side by side in a row, and incorporating therewithin at least one axially extending rotatable shaft common to each scavenger pump section with said shaft extending to and a predetermined distance through an end plate to expose an end of said shaft and having a scavenged oil outlet in said end plate to permit exit of any aerated oil pumped by said oil scavenger pump sections, an air oil separator integrally mounted with and supported at an end of said oil pump, said air oil separator comprising in a housing defining a cavity:

oil inlet means coupled to said scavenged oil outlet of said oil pump assembly for admitting aerated oil to said cavity;

centrifuge means for centrifugally separating air from oil in said cavity;

said centrifuge means comprising:

a rotatable shaft, said shaft having a hollow interior and an end that opens into said hollow interior and said shaft being coupled in driven relationship to said rotatable shaft of said oil pump assembly;

a pair of disks, said disks being coaxially mounted to said rotatable shaft for axial rotation by said shaft;

said rotatable shaft further including air passage     means for communicating air external of said rotatable shaft to within said shaft interior;

air exit means for exhausting air from said shaft interior external of said housing; and     oil outlet means, said oil outlet means being positioned within said cavity to receive oil separated by said centrifuge means.

22. The invention as defined in claim 21, further comprising: pressure operated valve means, said valve means normally closing said air outlet, and, responsive to the oil pressure of the oil within said cavity being below a predetermined level, for opening said air outlet.

* * * * *